United States Patent
Kinross

(10) Patent No.: US 8,240,087 B2
(45) Date of Patent: Aug. 14, 2012

(54) SLIDING WINDOW ASSEMBLY HAVING AN ENCAPSULATION WITH A SILICONE-BASED POLYMER

(75) Inventor: Brian Kinross, Florence, KY (US)

(73) Assignee: AGC Automotive Americas Co., Florence, KY (US)

( * ) Notice: Subject to any disclaimer, the term of this patent is extended or adjusted under 35 U.S.C. 154(b) by 2384 days.

(21) Appl. No.: 10/927,905

(22) Filed: Aug. 27, 2004

(65) Prior Publication Data

US 2005/0055884 A1 Mar. 17, 2005

Related U.S. Application Data

(60) Provisional application No. 60/499,235, filed on Aug. 29, 2003.

(51) Int. Cl.
*E06B 3/32* (2006.01)
(52) U.S. Cl. .................................. 49/380; 49/413
(58) Field of Classification Search ............ 49/116, 49/380, 413
See application file for complete search history.

(56) References Cited

U.S. PATENT DOCUMENTS

| | | | |
|---|---|---|---|
| 2,793,406 A * | 5/1957 | Focht ............................ | 49/490.1 |
| 4,823,511 A * | 4/1989 | Herliczek et al. .............. | 49/404 |
| 4,854,599 A | 8/1989 | Barteck .......................... | 277/227 |
| 5,264,270 A | 11/1993 | Agrawal ......................... | 428/192 |
| 5,315,788 A * | 5/1994 | Bensinger et al. ............. | 49/404 |
| 5,473,840 A | 12/1995 | Gillen et al. ................... | 49/380 |
| 5,505,023 A | 4/1996 | Gillen et al. ................... | 49/380 |
| 5,531,046 A | 7/1996 | Kollar et al. | |
| 5,566,510 A | 10/1996 | Hollingshead et al. ....... | 49/479.1 |
| 5,786,067 A | 7/1998 | Gold .............................. | 428/192 |
| 6,250,017 B1 | 6/2001 | Tessier ........................... | 49/440 |
| 6,368,700 B1 | 4/2002 | Venkataswamy et al. .... | 428/217 |
| 6,499,256 B1 | 12/2002 | Aritake et al. ................. | 49/441 |
| 6,591,552 B1 | 7/2003 | Rasmussen .................... | 49/413 |
| 6,602,589 B2 | 8/2003 | Venkataswamy et al. .... | 428/217 |
| 6,638,587 B1 * | 10/2003 | Wang et al. .................... | 428/35.7 |
| 6,708,450 B2 | 3/2004 | Tanaka et al. .................. | 49/441 |
| 6,955,009 B2 * | 10/2005 | Rasmussen .................... | 49/413 |
| 2003/0182866 A1 | 10/2003 | Nestell et al. .................. | 49/413 |
| 2005/0044799 A1 * | 3/2005 | Kinross et al. ................. | 49/413 |

FOREIGN PATENT DOCUMENTS

| | | |
|---|---|---|
| EP | 1336643 A1 | 8/2003 |
| EP | 1336643 B1 | 9/2003 |
| EP | 1344891 A1 | 9/2003 |

OTHER PUBLICATIONS

International Search Report of PCT International Application No. PCT/US2004/027849: Aug. 27, 2004.

* cited by examiner

*Primary Examiner* — Jerry Redman
(74) *Attorney, Agent, or Firm* — Howard & Howard Attorneys PLLC

(57) ABSTRACT

A sliding window assembly for a vehicle includes a sliding panel and a rail. The rail defines a channel for receiving the sliding panel. The sliding panel is movable between a closed position and an open position along the rail. An encapsulation at least partially encapsulates the sliding panel. The encapsulation includes a silicone-based polymer that has a minimal coefficient of friction. The encapsulation provides operational advantages to the sliding window assembly.

25 Claims, 7 Drawing Sheets

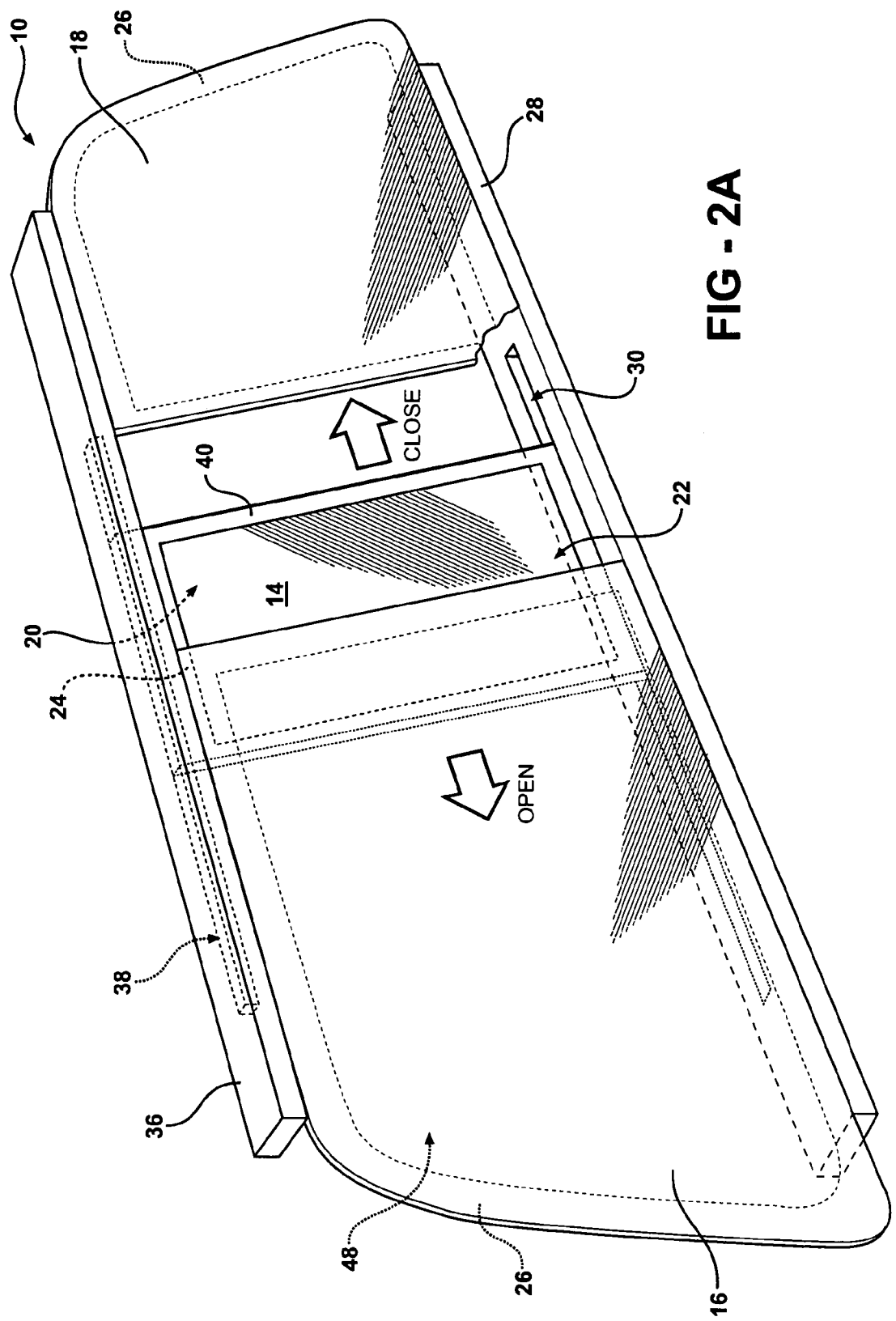

SLIDING WINDOW ASSEMBLY HAVING AN ENCAPSULATION WITH A SILICONE-BASED POLYMER

RELATED APPLICATIONS

This patent application claims priority to and all advantages of U.S. Provisional Patent Application 60/499,235, which was filed on Aug. 29, 2003.

BACKGROUND OF THE INVENTION

1. Field of the Invention

The subject invention generally relates to a sliding window assembly for a vehicle. More specifically, the sliding window assembly includes a sliding panel having an encapsulation with a silicone-based polymer for providing operational advantages to the sliding window assembly.

2. Description of the Related Art

Sliding window assemblies for vehicles are known in the art, especially for backlites of trucks. The assemblies generally include a rail that defines a channel. The assembly also includes a sliding panel that is movable between a closed and an open position along the rail. In addition, the assemblies typically include fixed panels on opposite sides of the sliding panel.

The assemblies of the prior art often encounter performance problems such as noise during sliding of the sliding panel or due to vibration of the sliding panel during operation of the vehicle, and water leakage around the sliding panel, i.e., between the sliding panel and the rail or the fixed panel. Various attempts have been made to develop mechanisms to reduce one or more of the aforementioned problems. For example, sliding window assemblies have been developed that include an elastomeric seal installed around a periphery of the sliding panel to prevent water leakage and squeaking during operation of the vehicle. The elastomeric seal is typically formed through an extrusion or molding process and subsequently attached to the sliding panel with an adhesive. One example of a conventional sliding window assembly having an elastomeric seal is disclosed in U.S. Pat. No. 6,591,552. However, the elastomeric seals of the prior art still present a multitude of operational problems. For example, the elastomeric seals tend to mechanically separate from the sliding panels due to repetitive sliding of the sliding panels and vibration during operation of the vehicles. Furthermore, the adhesive is subject to chemical degradation, which may also result in separation between the elastomeric seals and the sliding panels. As a result, one or more of the aforementioned problems may arise over the life of the vehicles.

Encapsulations for windows are also known in the art. For example, U.S. Pat. No. 5,264,270 discloses an encapsulation for a fixed panel in a vehicle. The encapsulation is formed on the fixed panel through reaction injection molding. The encapsulation includes multiple layers, and an outer layer is formed from a squeak-resistant material. However, the encapsulation including multiple layers is not suitable for sliding panels, since the multiple layers may delaminate during sliding. Furthermore, the outer layer does not possess sufficient strength to operate absent an inner layer, which is more rigid and provides support to the outer layer. Furthermore, the inner layer alone is susceptible to unwanted noise due to vibration during operation of the vehicle.

Thus, there is an opportunity to provide a sliding window assembly that overcomes the deficiencies of the prior art. More specifically, there is an opportunity to minimize resistance of the sliding panel to movement and/or minimize unwanted noise due to vibration during operation of the vehicle or during sliding of the sliding panel. There is also an opportunity to more effectively prevent water leakage through the sliding panel.

SUMMARY OF THE INVENTION AND ADVANTAGES

The subject invention provides a sliding window assembly for a vehicle. The window assembly includes a rail that defines a channel. A sliding panel is movable between a closed position and an open position along the rail. An encapsulation at least partially encapsulates the sliding panel. The encapsulation includes a silicone-based polymer that has a minimal coefficient of friction for providing operational advantages to the sliding window assembly.

The presence of the silicone-based polymer may minimize resistance of the sliding panel to movement and/or minimize unwanted noise due to vibration during operation of the vehicle or during sliding of the sliding panel. Furthermore, the silicone-based polymer effectively prevents water leakage through the sliding panel.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2A is a perspective view of one embodiment of the sliding window assembly including a sliding panel disposed for horizontal movement;

DETAILED DESCRIPTION OF A PREFERRED EMBODIMENT

Figure 1:
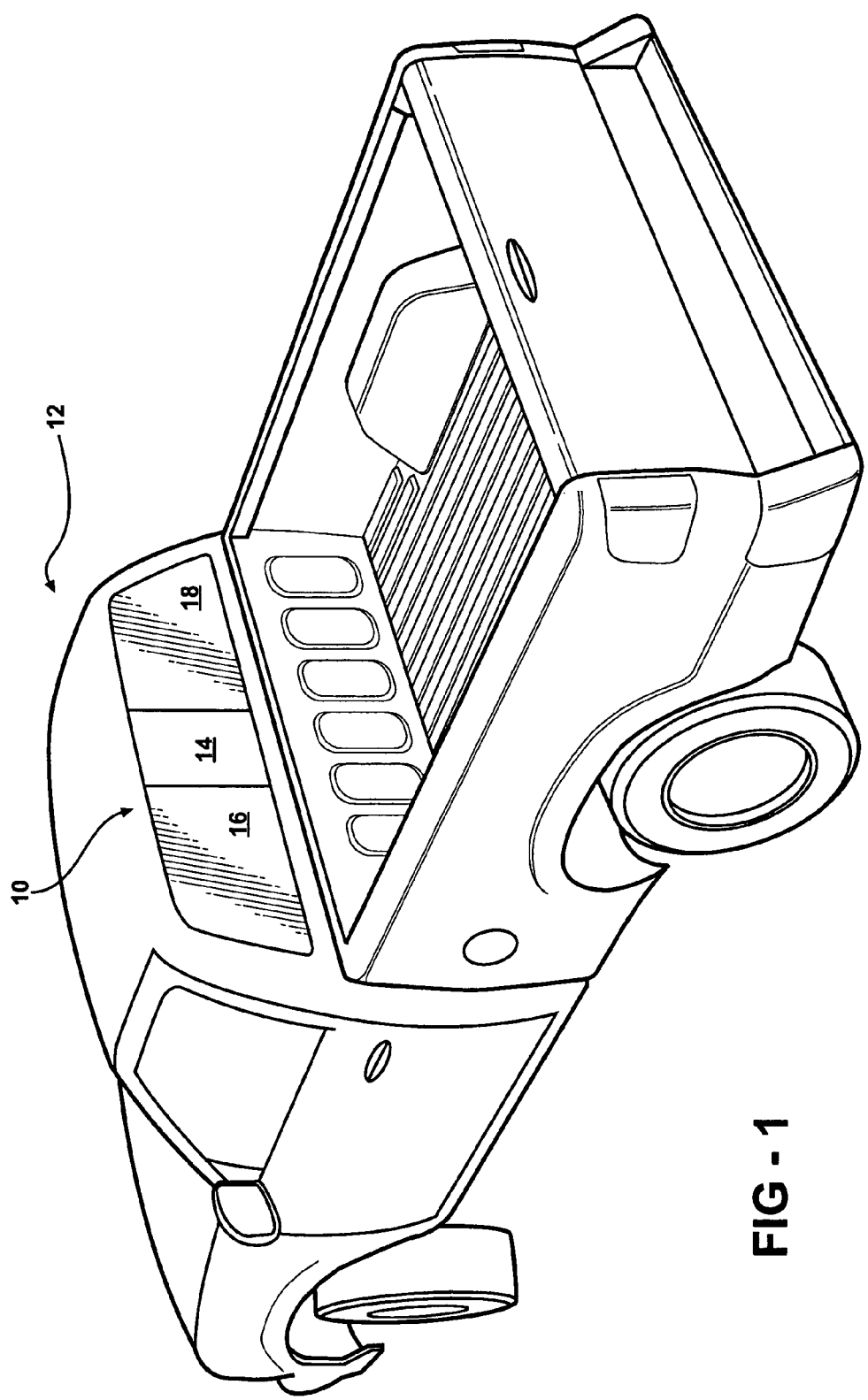
FIG. 1 is a perspective view of a vehicle including a sliding window assembly.

Referring to the Figures, wherein like numerals indicate like parts throughout the several views, a sliding window assembly is generally shown at 10. Referring to FIG. 1, the sliding window assembly 10 is preferably used for a vehicle 12. More specifically, the window assembly 10 is preferably a backlite, and the vehicle 12 is preferably a truck. However, the sliding window assembly 10 can be used for other applications such as a camper.

Figure 2B:
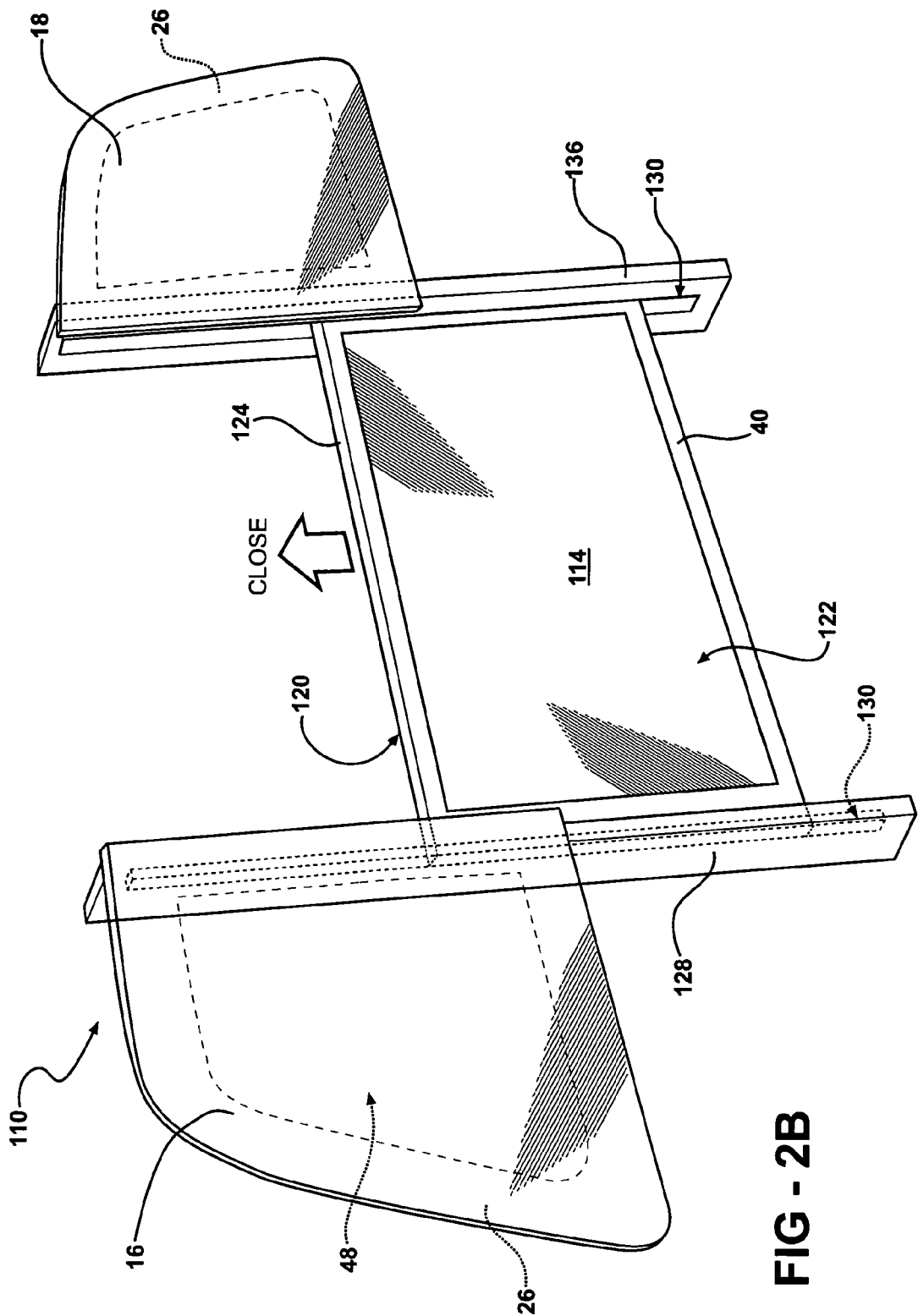
FIG. 2B is a perspective view of another embodiment of the sliding window assembly including a sliding panel disposed for vertical movement.

The sliding window assembly 10 includes a sliding panel 14 that moves between a closed and an open position. Referring to FIG. 2A, the sliding panel 14 may be disposed for horizontal movement. Alternatively, as shown in FIG. 2B, the sliding panel 114 may be disposed for vertical movement. Preferably, as shown in FIGS. 2A and 2B, the sliding window assembly 10 also includes a first fixed panel 16 that is disposed adjacent to the sliding panel 14; however, although not shown, it is to be appreciated that the sliding window assembly 10 may include the sliding panel 14 absent the first fixed panel 16, with the sliding panel 14 extending a width of the sliding window assembly 10. In a most preferred embodiment, the sliding window assembly 10 includes a second fixed panel 18 in addition to the first fixed panel 16. The second fixed panel 18 is laterally spaced from the first fixed panel 16 and defines an opening between the first fixed panel 16 and the second fixed panel 18 as the sliding panel 14 moves between the closed and open positions.

Preferably, the sliding panel 14 and the fixed panels 16, 18 are window panes that are translucent; however, the sliding panel 14 and fixed panels 16, 18 may be opaque, tinted, etc. The sliding panel 14 has an interior surface 20, an exterior surface 22, and a peripheral edge 24. The exterior surface 22 is disposed in spaced and parallel relationship to the interior surface 20, and the peripheral edge 24 extends about a periphery of the sliding panel 14 between the interior 20 and exterior 22 surfaces. The sliding panel 14 may include a ceramic layer 26 on at least one of the interior 20 and exterior 22 surfaces, adjacent to the peripheral edge 24, for blocking sunlight. Likewise, the fixed panels 16, 18 may similarly include the ceramic layer 26. However, it is to be appreciated that the ceramic layer 26 is optional.

The sliding window assembly 10 further includes a rail 28 that defines a channel 30. The sliding window assembly 10 preferably includes a second rail 36 disposed opposite the rail 28 across the sliding panel 14. The second rail 36 also defines a second channel 38. The sliding panel 14 is disposed in the channel 30. More specifically, the rail 28 is disposed adjacent to a first section 32 of the peripheral edge 24. In one embodiment, the peripheral edge 24 is disposed in the channel 30. In another embodiment, shown in FIG. 3A, an encapsulation 40 encapsulates the sliding panel 14, and the encapsulation 40 extends into the channel 30. When present, the first 16 and/or second 18 fixed panels are operatively connected to the rail 28. Preferably, an adhesive is used to operatively connect the first 16 and/or second 18 fixed panels to the rail 28; however, other methods of connection may also be used such as, for example, fastening a bracket (not shown) to the fixed panels 16, 18 and to the rail 28 to hold the fixed panels 16, 18 and the rail 28 together.

Figure 4A:
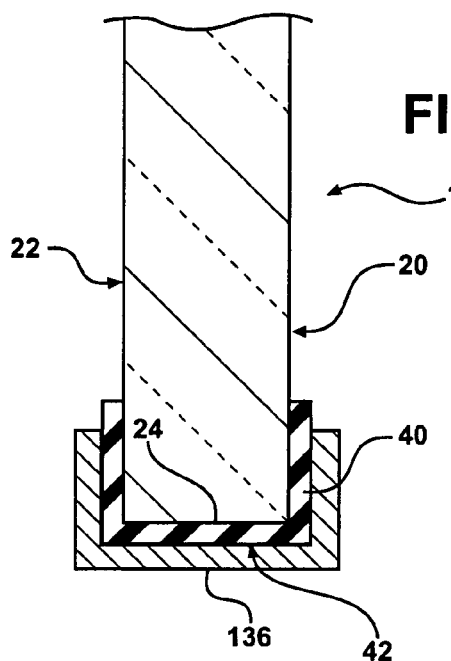
FIG. 4A is a partial cross-sectional side view of the sliding panel of FIG. 3A taken along line 4A-4A.
Figure 4B:
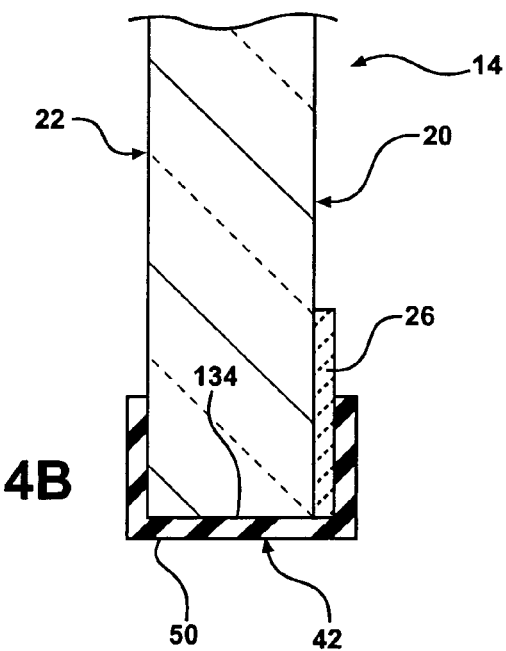
FIG. 4B is a partial cross-sectional side view of the sliding panel of FIG. 3C taken along line 4B-4B.
Figure 4C:
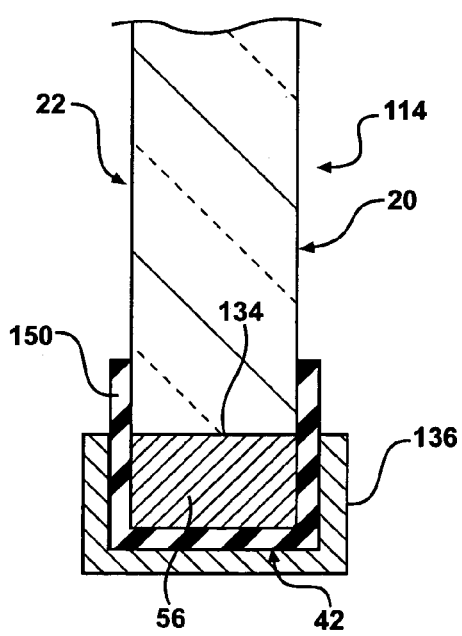
FIG. 4C is a partial cross-sectional side view of the sliding panel of FIG. 3F taken along line 4C-4C.
Figure 4D:
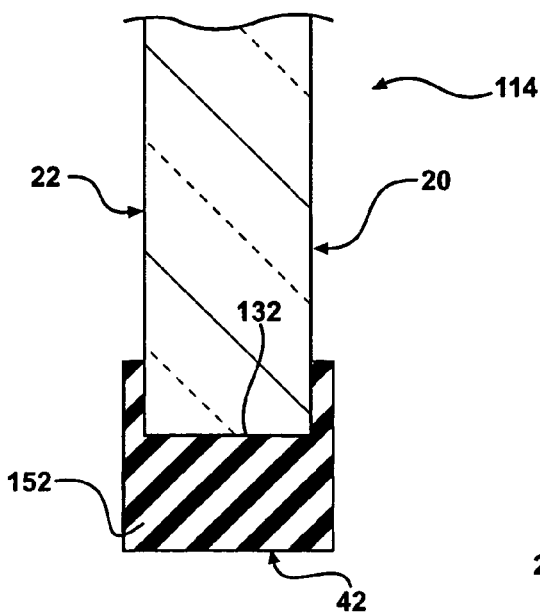
FIG. 4D is a partial cross-sectional side view of the sliding panel of FIG. 3F taken along line 4D-4D.
Figure 4E:
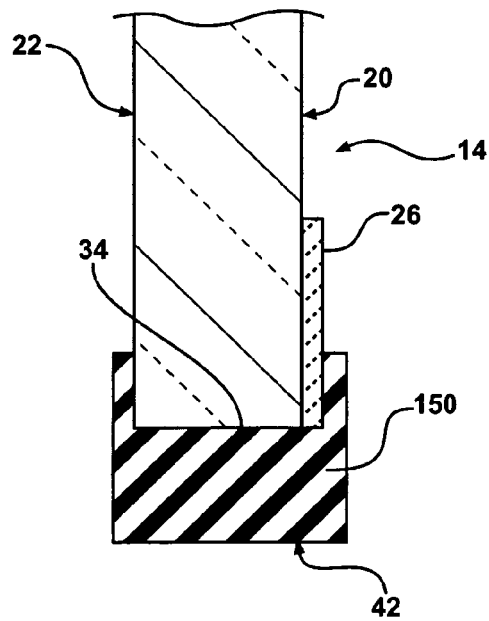
FIG. 4E is a partial cross-sectional side view of the sliding panel of FIG. 3E taken along line 4E-4E.

The channel 30 may be defined in a variety of configurations for effectively receiving the sliding panel 14. For example, as shown in FIG. 4C, the channel 30 may have a U-shaped cross section. Other configurations may also be suitable, such as a step-patterned cross-section, a V-shaped cross section, etc.

The sliding panel 14 is movable between the closed and open positions along the rail 28. Preferably, the first section 32 of the peripheral edge 24 is straight to minimize resistance of the sliding panel 14 to movement; however, it is to be appreciated that the first section 32 may have a slight curvature so long as the movement of the sliding panel 14 remains unimpeded.

Preferably, the sliding window assembly 10 includes the second rail 36 that defines the second channel 38. The sliding panel 14 is also disposed in the second channel 38 to stabilize the sliding panel 14 and prevent the sliding panel 14 from falling out of the channel 30 in the rail 28. Likewise, the first 16 and second 18 fixed panels are also operatively connected to the second rail 36. Preferably, the second rail 36 is disposed in spaced and parallel relationship to the rail 28 and adjacent to the first section 32 of the peripheral edge 24 that is opposite the first section 32. As referred to herein, the first section 32 of the peripheral edge 24 is always opposite the second section 34 across the sliding panel 14. More specifically, the first 32 and second 34 sections may both extend horizontally or, alternatively, the first 32 and second 34 sections may both extend vertically, depending upon whether the sliding panel 14 is disposed for horizontal movement (FIG. 2A), or vertical movement (FIG. 2B).

The rails 28, 36 may extend horizontally or vertically, depending on a direction of movement desired for the sliding panel 14. For example, as shown in FIG. 2A, the sliding window assembly 10 includes the sliding panel 14 disposed for horizontal movement between the open and closed positions. As such, the rail 28 extends horizontally, from a perspective of the sliding window assembly 10 installed on the vehicle 12, to facilitate the horizontal movement of the sliding panel 14. The second rail 36 also extends horizontally and is disposed adjacent to the first section 32 of the peripheral edge 24. Alternatively, referring to FIG. 2B, the sliding window assembly 110 includes the sliding panel 114 disposed for vertical movement between the open and closed positions. The rails 128, 136 extend vertically, also from the perspective of the sliding window assembly 110 installed on the vehicle 12, to facilitate the vertical movement of the sliding panel 114. The rail 128 defines the first channel 130, and the second rail 136 defines the second channel 138. The sliding window assembly 110 also includes the first fixed panel 116 and the second fixed panel 118.

The encapsulation 40 at least partially encapsulates the sliding panel 14. The encapsulation 40 is formed from an encapsulation composition which includes a silicone-based polymer and, optionally, a second polymer, to be described in further detail below. Preferably, the encapsulation 40, more specifically the encapsulation composition, is reaction injection molded onto the sliding panel 14 to form a direct bond between the encapsulation 40 and the sliding panel 14. More specifically, a mold (not shown) is provided and the sliding panel 14 is placed in the mold. The mold defines a recess or recesses adjacent to the sliding panel 14 for receiving the encapsulation 40. As such, the recess is shaped to produce a desired pattern of the encapsulation 40 on the sliding panel 14 when the encapsulation 40 is molded onto the sliding panel 14. The encapsulation 40 is reaction injection molded into the recess and onto the sliding panel 14, after which the sliding panel 14 is removed from the mold. The direct bond exhibits excellent resistance to delamination from the sliding panel 14 over time and when the sliding panel 14 is subjected to repetitive cycling. Other methods of encapsulating the encapsulation 40 onto the sliding panel 14 may also be suitable for the subject invention so long as the encapsulation 40 is directly bonded onto the sliding panel 14.

The encapsulation 40 includes the silicone-based polymer, which has a minimal coefficient of friction for providing operational advantages to the sliding window assembly 10, to be discussed in further detail below. Preferably, the silicone-based polymer comprises:

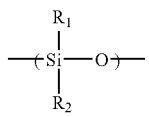

wherein $R_1$ and $R_2$ are each selected from the group of alkyl groups, vinyl groups, phenyl groups, and combinations thereof. Such a structure is commonly referred to as a polyorganosiloxane. Examples of polysiloxanes and other silicone-based polymers suitable for use in the encapsulation of the subject invention include, but are not limited to, silicone rubbers commercially available under the trade name Silastic® from Dow Corning and silicone additives commercially available under the trade name Dow Corning® MB40-006 Silicone Masterbatch and MB50-008 Silicone Masterbatch, both commercially available from Dow Corning.

The polyorganosiloxane is included in the encapsulation 40 to minimize friction as the sliding panel 14 moves, which minimizes unwanted noise and resistance of the sliding panel 14 to movement, and may also provide water repellency. More specifically, during the reaction injection molding, the polyorganosiloxane migrates within the encapsulation 40 toward an outer surface 42 of the encapsulation 40 to minimize a coefficient of friction of the encapsulation 40 at the outer surface 42 and to provide water repellency at the outer surface 42. More specifically, the polyorganosiloxane has a surface tension that is lower than a surface tension of water, which causes water to bead when in contact with the encapsulation 40 and prevents water from wetting the outer surface 42 of the encapsulation 40.

Preferably, the encapsulation 40 can be entirely formed from the silicone-based polymer. However, the encapsulation 40 may also include the second polymer that is different from the silicone-based polymer. The second polymer may provide structural support to the encapsulation 40 and maximize wear resistance of the encapsulation 40. When present, the second polymer is preferably selected from the group of neoprene, nylon, acrylic latex, polyvinyl chloride, polypropylene, polyethylene terephthalate, polybutylene terephthalate, polycarbonate terephthalate, thermoplastic polyolefin, thermoplastic vulcanizates, polyurethanes, polythiourethanes, thermoplastic urethane, acrylonitrile-butadiene-styrene, a terpolymer of ethylene, propylene, and diene monomers (EPDM rubber), and combinations thereof.

As alluded to above, the silicone-based polymer is preferably present in the encapsulation 40 in an amount of 100 parts by weight based on the total weight of the encapsulation 40. That is, the encapsulation is preferably formed exclusively from the silicone-based polymer. Silicone-based polymers typically provide attractive adhesion properties to glass compositions, such as soda-lime-silica glass that is typically used in the sliding panel 14, without the need for supplemental adhesion promoters.

It is to be appreciated that lesser amounts of the silicone-based polymer may be used by balancing the adhesion properties of the encapsulation relative to the glass composition of the sliding panel 14. The coefficient of friction of the encapsulation 40 including the silicone-based polymer is preferably less than or equal to 0.75. Additional additives may also be included in the encapsulation 40, such as pigments, ultraviolet light stabilizers, catalysts, cross-linking agents, etc. However, if present, such additives are included in trace amounts, with the second polymer forming the balance of the encapsulation composition.

In a preferred embodiment, as shown in the FIGS. 3A through 4F, the encapsulation 40 is further defined as a three-sided encapsulation. More specifically, the encapsulation 40 at least partially encapsulates each of the interior surface 20, the exterior surface 22, and the peripheral edge 24. When the ceramic layer 26 is present, as shown in FIGS. 4B and 4E, the encapsulation 40 may also at least partially encapsulate the ceramic layer 26. Although not shown, in another embodiment, the encapsulation may be further defined as a one-sided encapsulation, in which the encapsulation at least partially encapsulates one of the interior surface 20, the exterior surface 22, and the peripheral edge 24. In another embodiment, also not shown, the encapsulation may be further defined as a two-sided encapsulation, in which the encapsulation at least partially encapsulates two of the interior surface 20, the exterior surface 22, and the peripheral edge 24. For example, the encapsulation may encapsulate the interior surface 20 and the peripheral edge 24, or alternatively, the exterior surface 22 and the peripheral edge 24.

The encapsulation 40 may have varying degrees of thickness, depending on the operational advantage sought. For example, referring to FIGS. 4A, 4B, and 4F, the encapsulation 40, 140, 340 is of relatively uniform thickness on the interior surface 20, the exterior surface 22, and the peripheral edge 24 and provides the operational advantage of water repellency, i.e., the encapsulation 40, 140, 340 is in sealing engagement with the fixed panels 16, 18, due to the surface tension of the silicone-based polymer.

Alternatively, as shown in FIGS. 4C through 4F, the encapsulation 240 operates as a tab 240. More specifically, the encapsulation 240 may be of greater thickness adjacent the peripheral edge 24, compared to the thickness of the encapsulation 240 adjacent the interior 20 and exterior 22 surfaces, for defining the tab 240 adjacent to the peripheral edge 24. The tab 240 extends from the first section 32 of the peripheral edge 24 and into the channel 30. The tab 240 operatively engages the rail 28 to provide reduced friction as the operational advantage. It is to be appreciated that the encapsulation 340 may provide the operational advantages of both water repellency and reduced friction. More specifically, as shown in FIG. 3H, the encapsulation 340 may include both portions of substantially uniform thickness between the interior surface 20, the exterior surface 22, and the peripheral edge 24, and other portions of greater thickness adjacent to the peripheral edge 24.

Figure 3A:
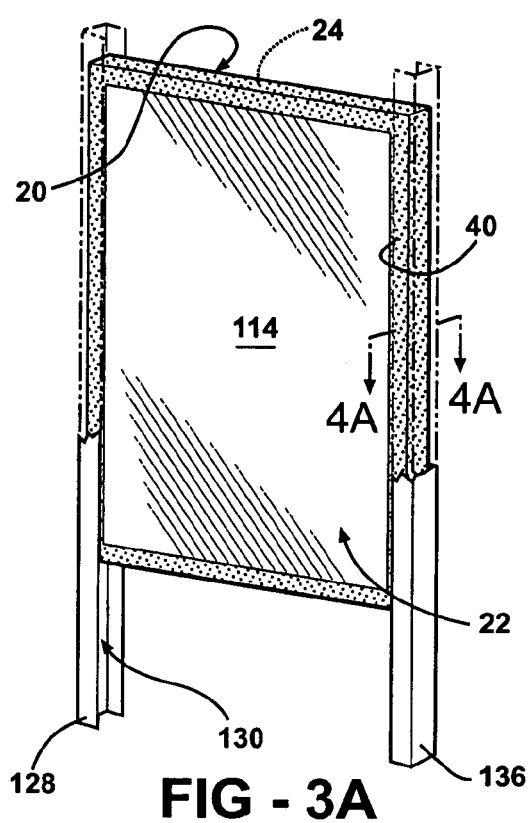
FIG. 3A is a perspective view of one embodiment of a sliding panel having an encapsulation extending along an entirety of a peripheral edge.
Figure 3B:
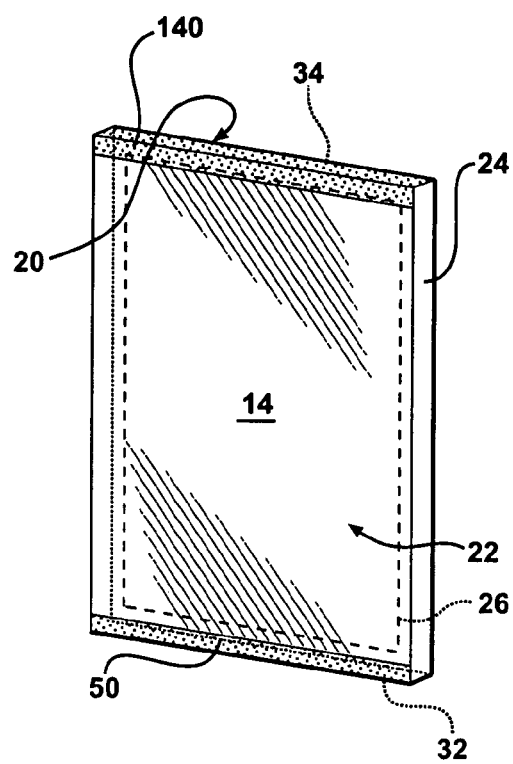
FIG. 3B is a perspective view of another embodiment of the sliding panel having the encapsulation and a second encapsulation extending horizontally along the peripheral edge.
Figure 3C:
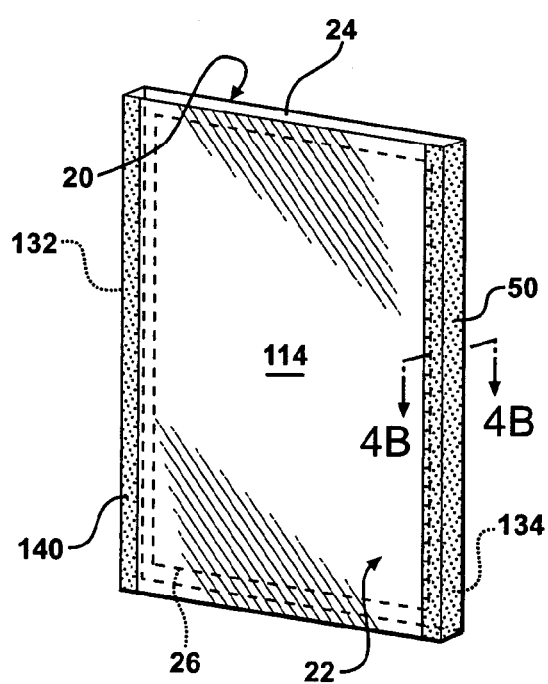
FIG. 3C is a perspective view of another embodiment of the sliding panel having the encapsulation and a second encapsulation extending vertically along the peripheral edge.
Figure 3D:
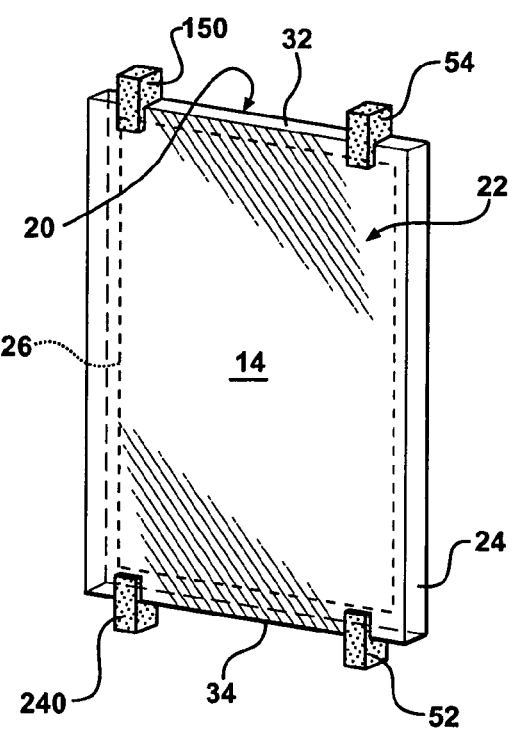
FIG. 3D is a perspective view of another embodiment of the sliding panel having a plurality of encapsulations operating as tabs and that extend horizontally along the peripheral edge.
Figure 3E:
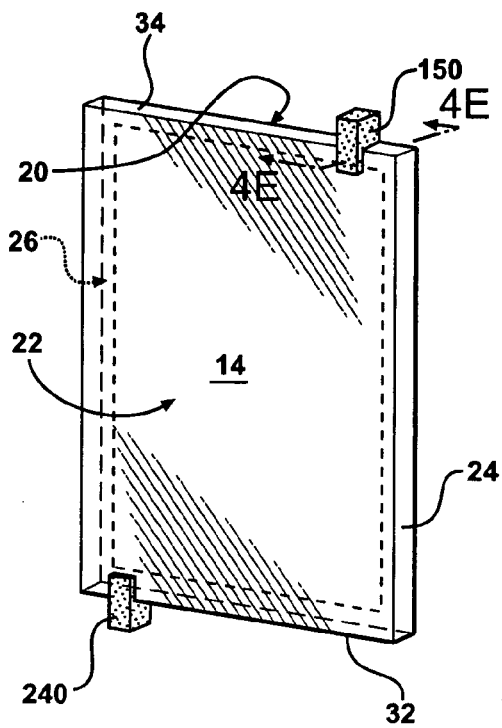
FIG. 3E is a perspective view of another embodiment of the sliding panel having a pair of encapsulations operating as tabs and that extend horizontally along the peripheral edge.
Figure 3F:
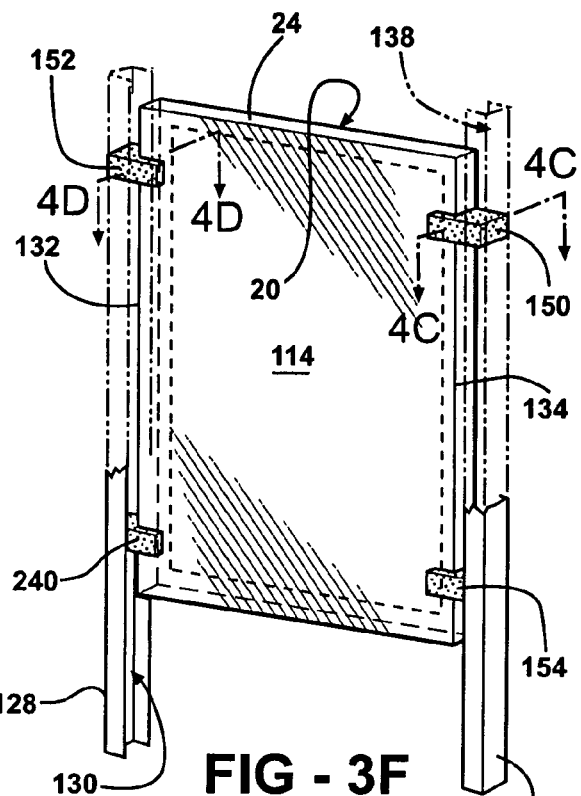
FIG. 3F is a perspective view of another embodiment of the sliding panel having the plurality of encapsulations operating as tabs and that extend vertically along the peripheral edge.
Figure 3G:
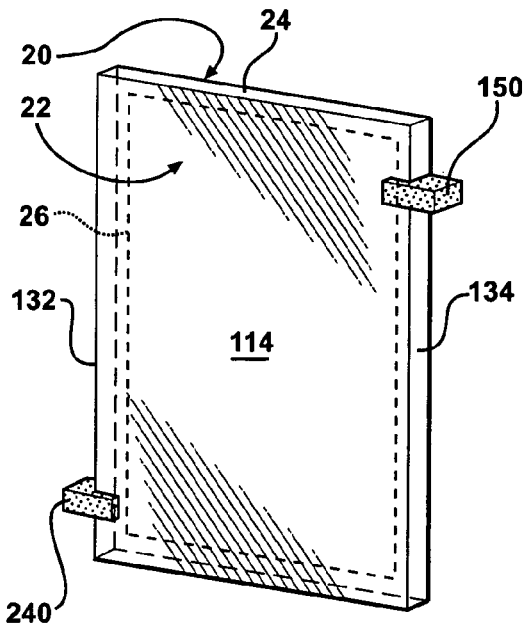
FIG. 3G is a perspective view of another embodiment of the sliding panel having the pair of encapsulations operating as tabs and that extend vertically along the peripheral edge.
Figure 3H:
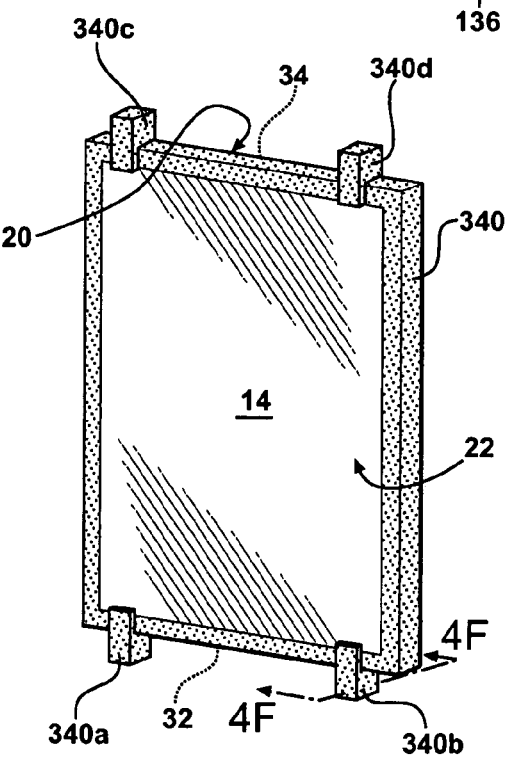
FIG. 3H is a perspective view of another embodiment of the sliding panel having the encapsulation extending along the entirety of the peripheral edge and further defining tabs that extend horizontally along the peripheral edge.

In one embodiment, as shown in FIGS. 3A and 3H, the encapsulation 40, 340 may extend along an entirety of the peripheral edge 24 to provide water repellency as the operational advantage. However, it is to be appreciated that the encapsulation 40, 340 may also provide reduced friction as the operational advantage. More specifically, a fixed interior surface 48 of the first fixed panel 16 is in sealing engagement with the encapsulation 40, 340 for preventing water from passing between the encapsulation 40, 340 and the first fixed panel 16. A similar relationship may also exist between the second fixed panel 18 and the encapsulation 40, 340. Referring to FIG. 3H, the encapsulation 340 may further operate as the tab 340a that extends from the first section 32 of the peripheral edge 24 and into the channel 30 to further provide reduced friction as the operational advantage in addition to the water repellency. Preferably, the encapsulation 340 further operates as a series of tabs 340a, 340b, 340c, 340d that extend from the first 32 and second 34 sections of the peripheral edge 24 and into the channel 30 and second channel 38, respectively, to stabilize the sliding panel 14.

In another embodiment, shown in FIGS. 3B and 3C, the encapsulation 140 extends along an entirety of the first section 32 of the peripheral edge 24. Thus, as shown in FIGS. 2A and 2B, the first fixed panel 16 is in sealing engagement with the encapsulation 140. Referring to FIG. 3B, the first section 32 of the peripheral edge 24 may be horizontally disposed, or alternatively, referring to FIG. 3C, the first 132 and second 134 sections of the peripheral edge 24 may be vertically disposed, depending upon whether the sliding panel 14 is disposed for horizontal or vertical movement. Preferably, a second encapsulation 50 extends along an entirety of the first section 32 of the peripheral edge 24 to also provide water repellency as the operational advantage. More specifically, the second fixed panel 18 is in sealing engagement with the second encapsulation 50 to prevent water from passing between the second encapsulation 50 and the second fixed panel 18. The second encapsulation 50 also includes the silicone-based polymer set forth above.

In another embodiment, as best shown in FIGS. 3D through 3G, the encapsulation 240 encapsulates at least a portion of said first section 32. More specifically, the encapsulation 240 operates as the tab 240 and extends from the first section 32 of the peripheral edge 24 and into the channel 30. The tab 240 operatively engages the rail 28 to provide reduced friction as the operational advantage. Preferably, the sliding panel 14 further includes the second encapsulation 150 that encapsulates at least a portion of the first section 32. The second encapsulation 150 operates as a second tab 150 and extends from the first section 32 of the peripheral edge 24 and into the second channel 38. The second tab 150 operatively engages the second rail 36 to also provide reduced friction as the operational advantage. Preferably, as best shown in FIGS. 3E and 3G, the second encapsulation 150 extends diagonally across the sliding panel 14 from the first encapsulation 240 to more effectively stabilize the sliding panel 14. In one embodiment, shown in FIGS. 3D and 3F, a third encapsulation 52 also encapsulates at least a portion of the first section 32 and extends adjacent to the first encapsulation 240, opposite to the second encapsulation 150. The third encapsulation 52 operates as a third tab 52 that extends from the first section 32 and into the channel 30 to further stabilize the sliding panel 14. Likewise, a fourth encapsulation 54 may encapsulate the first section 32 and extend adjacent to the second encapsulation 150, opposite to the first encapsulation 240. The fourth encapsulation 54 operates as a fourth tab 54 that extends from the first section 32 and into the second channel 38 to further stabilize the sliding panel 14.

In one embodiment, as shown in FIG. 4C, the sliding window assembly 10 may further include a metal member 56 extending from the sliding panel 14, more specifically, the first section 32 of the peripheral edge 24. The metal member 56 may be operatively connected to the first section 32 through glass-to-metal bonding techniques such as thermocompression bonding, adhering with an adhesive, etc. In one embodiment, the tab 240 encapsulates the metal member 56. The metal member 56 provides reinforcement and support to the tab 240 to prevent the tab 240 from breaking when force is applied to the sliding panel 114. Furthermore, when present, the second 150, third 52, and fourth 54 tabs as described above may also encapsulate corresponding metal members (not shown).

Figure 4F:
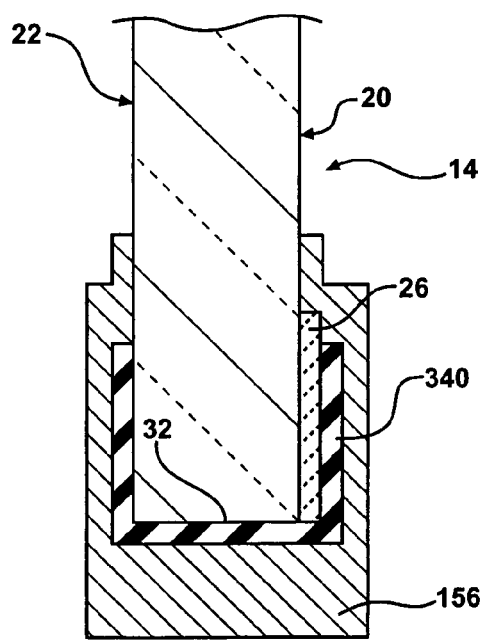
FIG. 4F is a partial cross-sectional side view of the sliding panel of FIG. 3H taken along line 4F-4F.

Alternatively, as shown in FIG. 4F, the metal member 156 may be formed over the encapsulation 40. In other words, the metal member 156 may extend directly from the sliding panel 114 and into the channel 30. The encapsulation 40 may still provide water repellency as the operative advantage around the metal member 156.

Obviously, many modifications and variations of the present invention are possible in light of the above teachings. It is, therefore, to be understood that within the scope of the appended claims, the invention may be practiced otherwise than as specifically described

What is claimed is:
1. A sliding window assembly for a vehicle, said window assembly comprising:
a rail defining a channel;
a sliding panel movable between a closed position and an open position along said rail;
an encapsulation at least partially encapsulating said sliding panel;
said encapsulation comprising a silicone-based polymer having a minimal coefficient of friction for providing operational advantages to said sliding window assembly.
2. An assembly as set forth in claim 1 wherein said silicone-based polymer comprises:

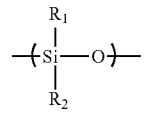

wherein $R_1$ and $R_2$ are each selected from the group of alkyl groups, vinyl groups, phenyl groups, and combinations thereof.
3. An assembly as set forth in claim 1 wherein said encapsulation further comprises a second polymer different from said silicone-based polymer.
4. An assembly as set forth in claim 3 wherein said second polymer is selected from the group of neoprene, nylon, acrylic latex, polyvinyl chloride, polypropylene, polyethylene terephthalate, polybutylene terephthalate, polycarbonate terephthalate, thermoplastic polyolefin, thermoplastic vulcanizates, polyurethanes, polythiourethanes, thermoplastic urethane, acrylonitrile-butadiene- styrene, a terpolymer of ethylene, propylene, and diene monomers, and combinations thereof.
5. An assembly as set forth in claim 1 wherein said encapsulation is reaction injection molded onto said sliding panel.
6. An assembly as set forth in claim 1 wherein said sliding panel has an interior surface, an exterior surface disposed in spaced and parallel relationship to said interior surface, and a peripheral edge extending about a periphery between said interior and exterior surfaces.
7. An assembly as set forth in claim 6 wherein said encapsulation encapsulates at least a portion of said peripheral edge.
8. An assembly as set forth in claim 7 wherein said encapsulation encapsulates at least a portion of said interior surface.

9. An assembly as set forth in claim 8 wherein said encapsulation encapsulates at least a portion of said exterior surface.

10. An assembly as set forth in claim 7 wherein said encapsulation extends along an entirety of said peripheral edge to provide water repellency as the operational advantage.

11. An assembly as set forth in claim 10 further comprising a first fixed panel disposed adjacent said sliding panel and operatively connected to said rail.

12. An assembly as set forth in claim 11 wherein said first fixed panel has an fixed interior surface in sealing engagement with said encapsulation for preventing water from passing therebetween.

13. An assembly as set forth in claim 12 further comprising a second fixed panel laterally spaced from said first fixed panel and defining an opening therebetween as said sliding panel moves between said closed and open positions.

14. An assembly as set forth in claim 6 wherein said peripheral edge comprises a first section and a second section opposite said first section.

15. An assembly as set forth in claim 14 wherein said encapsulation encapsulates at least a portion of said first section.

16. An assembly as set forth in claim 15 wherein said encapsulation extends along an entirety of said first section to provide water repellency as the operational advantage.

17. An assembly as set forth in claim 15 further comprising a second encapsulation also comprising said silicone-based polymer and encapsulating at least a portion of said second section.

18. An assembly as set forth in claim 17 wherein said second encapsulation extends along an entirety of said second section to provide water repellency as the additional operational advantage.

19. An assembly as set forth in claim 15 wherein said rail is disposed adjacent said first section of said peripheral edge.

20. An assembly as set forth in claim 19 wherein said encapsulation is further defined as a tab extending from said first section of said peripheral edge and into said channel thereby operatively engaging said rail to provide reduced friction as the operational advantage.

21. An assembly as set forth in claim 20 further comprising a metal member extending from said first section of said peripheral edge wherein said tab encapsulates said metal member.

22. An assembly as set forth in claim 20 further comprising a second encapsulation also comprising said silicone-based polymer and encapsulating at least a portion of said second section.

23. An assembly as set forth in claim 22 further comprising a second rail defining a second channel, wherein said second rail is disposed in spaced and parallel relationship to said rail and adjacent said second section of said peripheral edge.

24. An assembly as set forth in claim 23 wherein said second encapsulation is further defined as a second tab extending from said second section of said peripheral edge and into said second channel thereby operatively engaging said second rail to provide reduced friction as the operational advantage.

25. An assembly as set forth in claim 24 further comprising a metal member extending from said second section of said peripheral edge wherein said tab encapsulates said metal member.

* * * * *